United States Patent
Kuriiwa et al.

(10) Patent No.: US 7,175,928 B2
(45) Date of Patent: Feb. 13, 2007

(54) HYDROGEN SUPPLYING APPARATUS FOR FUEL CELL

(75) Inventors: Takahiro Kuriiwa, Saitama (JP); Toshiaki Shimada, Saitama (JP); Yoshio Nuiya, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 477 days.

(21) Appl. No.: 10/280,345

(22) Filed: Oct. 24, 2002

(65) Prior Publication Data
US 2003/0077492 A1 Apr. 24, 2003

(30) Foreign Application Priority Data
Oct. 24, 2001 (JP) .............................. 2001-325756

(51) Int. Cl.
*H01M 8/04* (2006.01)
(52) U.S. Cl. ............................. 429/22; 429/23; 429/34
(58) Field of Classification Search ................... None
See application file for complete search history.

(56) References Cited

U.S. PATENT DOCUMENTS

| | | | |
|---|---|---|---|
| 6,294,276 B1 | 9/2001 | Ogino | ........................ 429/17 |
| 6,649,291 B1 | 11/2003 | Iijima et al. | |
| 2002/0114984 A1* | 8/2002 | Edlund et al. | ................ 429/19 |
| 2002/0136937 A1* | 9/2002 | Kelley et al. | ................ 429/17 |
| 2003/0059656 A1* | 3/2003 | Horiguchi et al. | ........... 429/17 |
| 2003/0153455 A1* | 8/2003 | Wang et al. | ................ 502/329 |
| 2004/0110044 A1* | 6/2004 | McArthur et al. | ........... 429/13 |
| 2005/0064253 A1* | 3/2005 | Edlund et al. | ................ 429/13 |

FOREIGN PATENT DOCUMENTS

| | | |
|---|---|---|
| JP | 05-299105 | 11/1993 |
| JP | 11-329472 | 11/1999 |
| JP | 2001-15142 | 1/2001 |

* cited by examiner

*Primary Examiner*—John S. Maples
(74) *Attorney, Agent, or Firm*—Lahive & Cockfield LLP; Anthony A. Laurentano, Esq.

(57) ABSTRACT

A hydrogen supplying apparatus mounted on an electric vehicle. The electric vehicle is driven by electricity generated at a fuel cell by an electrochemical reaction between hydrogen stored in a hydrogen storage tank and oxygen. The hydrogen supplying apparatus includes: a hydrogen supply passage for supplying hydrogen from the hydrogen storage tank to the fuel cell; a bypass passage arranged in parallel with the hydrogen supply passage and for supplying hydrogen to the fuel cell; a purifier provided in the bypass passage, the purifier purifying hydrogen to be supplied to the fuel cell; and a switch valve selectively switching the hydrogen supply passage and the bypass passage.

9 Claims, 8 Drawing Sheets

HYDROGEN SUPPLYING APPARATUS FOR FUEL CELL

FIELD OF THE INVENTION

The present invention relates to a hydrogen supplying apparatus for a fuel cell, which is mounted on a fuel cell powered vehicle. More specifically, the present invention relates to a hydrogen supplying apparatus for a fuel cell, which is provided with a hydrogen separator where hydrogen supplied to the fuel cell is transmitted not to lower below a predetermined purity (concentration).

BACKGROUND OF THE INVENTION

In recent years, polymer electrolyte fuel cells (PEFC) have been drawn attention as a power source for electric vehicles. Polymer electrolyte fuel cells have been adapted in practical use for various applications as they generate electricity at ordinary temperature.

Generally, a fuel cell system is divided into the cathode and the anode by a solid polymer electrolyte membrane. The cathode and the anode are placed in opposite relation across the solid polymer electrolyte membrane. The fuel cell system is supplied with oxygen in the air that is fed to the cathode and hydrogen that is fed to the anode, so that oxygen and hydrogen are chemically reacted to generate electricity for driving an outer load.

The following methods are generally known to supply a fuel for the fuel cell as a hydrogen supply source.

(1) Pure hydrogen-fueled type wherein a liquid hydrogen storage tank, a high pressure tank, or a hydrogen storage material such as hydrogen absorbing alloys is supplied with hydrogen in the form of pure hydrogen such as liquid hydrogen or high-pressured hydrogen to provide a hydrogen supply source.

(2) Reforming type wherein hydrogen is produced by means of steam reforming by the use of hydrocarbon such as methanol solution.

Meanwhile, as hydrogen supplying methods at a high pressure hydrogen supplying-type hydrogen station where high pressure hydrogen is supplied to a hydrogen storage tank mounted on the vehicle, the flowing methods are known.

(1) Hydrogen that is produced at a combinat followed by liquefaction is transported to a hydrogen station, and the liquid hydrogen is vaporized and pressurized at the hydrogen station.

(2) Organic gas such as natural gas, methanol, or organic liquid fuel such as gasoline is reformed on site by the use of a reformer, and the reformed gas is pressurized and supplied.

(3) Hydrogen is obtained on site from organics, metal complex/chemical hydrides, etc., and the obtained hydrogen is pressurized and supplied.

However, in these hydrogen supplying methods for supplying high pressure hydrogen, impurities are often mixed into hydrogen by the following reasons.

(1) When organic gas such as natural gas, methanol, or organic liquid fuel such as gasoline is reformed on site by the use of a reformer, carbon monoxide gas is generated during the fuel reforming process and the generated gas is mixed into hydrogen as impurities.

(2) Contents of lubricating oil that is used for lubrication of a hydrogen pressurizing apparatus during the pressurizing process of hydrogen are mixed into hydrogen as impurities.

(3) Extremely small amount of moisture or contaminants are mixed from a hydrogen supply hose as impurities.

(4) If a reforming catalyst of the reformer that is used for the hydrogen production process is not in good condition, by-products other than hydrogen are produced and mixed into hydrogen as impurities.

(5) Because of accumulation of these impurities, purity (concentration) of supplied hydrogen may become lower than the allowable hydrogen purity (allowable hydrogen concentration) of the fuel cell.

Performance of the fuel cell decreases seriously if low purity hydrogen including a great amount of impurities is used.

For example, if impurities mixed into a hydrogen fuel in the fuel cell restrict a chemical reaction at the electric pole, generation of power voltage decreases at the fuel cell, that is, the output of the fuel cell decreases. For this reason, in an on-board fuel cell provided with a hydrogen storage/supplying apparatus, it is necessary to prevent impurities from being supplied to the fuel cell by taking measures at utility device (on-board) side with respect to the impurities mixed into hydrogen that is supplied from the hydrogen station (on-site).

As shown in FIG. 8, a membrane separation device 102 is known as a hydrogen separator where only hydrogen is separated from low purity hydrogen including a great amount of impurities. When hydrogen including impurities (i.e., carbon monoxide gas) is supplied to the membrane separation device 102, hydrogen passes through the separation membrane whereas impurities do not pass through the separation membrane, so that the amount of impurities that passes through the membrane separation device 102 decreases and the purity of hydrogen is improved accordingly. Meanwhile, the concentration of impurities (carbon monoxide gas) that have not allowed to pass through the separation membrane increases in the membrane separation device 102. If pressure at the low purity hydrogen side (upstream of the separation membrane) is constant, purifying rate at the separation membrane decreases due to increased partial pressure of the constituents of impurities and decreased partial pressure of hydrogen. For this reason, it is necessary to remove or release the impurities-containing gas (bleed gas). In this instance, hydrogen at the low purity hydrogen side is discharged together.

In view of the aforementioned drawbacks, the object of the present invention is thus to provide a hydrogen supplying apparatus for a fuel cell, which enables hydrogen supplied to the fuel cell to be retained not less than a predetermined purity (concentration) and further improves the utilization efficiency of hydrogen supplied to the fuel cell.

SUMMARY OF THE INVENTION

According to the present invention, there is provided a hydrogen supplying apparatus mounted on an electric vehicle, the electric vehicle being driven by electricity generated at a fuel cell by an electrochemical reaction between hydrogen stored in a hydrogen storage tank and oxygen, comprising: a hydrogen supply passage for supplying hydrogen from the hydrogen storage tank to the fuel cell; a bypass passage arranged in parallel with the hydrogen supply passage and for supplying hydrogen to the fuel cell; a purifier provided in the bypass passage, the purifier purifying hydrogen to be supplied to the fuel cell; and a switch valve selectively switching the hydrogen supply passage and the bypass passage.

In accordance with one preferable application of the present invention, the purifier comprises a hydrogen separation membrane and supplies the fuel cell with hydrogen that has passed through the hydrogen separation membrane.

With this construction of the hydrogen supplying apparatus, the hydrogen supply passage and the bypass passage provided with the purifier can be switched selectively when needed. As a result, the purifier does not have to drive at all times, leading to improvement in the utilization efficiency of hydrogen to be supplied from the hydrogen storage tank to the fuel cell.

In accordance with another preferable application of the present invention, the hydrogen supplying apparatus further comprises a hydrogen concentration detection means for detecting a concentration of hydrogen to be supplied to the fuel cell, and the switch valve is controlled to switch the hydrogen supply passage and the bypass passage based on a detection result of the hydrogen concentration detection means.

In this construction of the hydrogen supplying apparatus, the hydrogen concentration detection means may detect a concentration of hydrogen within the hydrogen storage tank.

Also, the hydrogen concentration detection means may detect a concentration of hydrogen within the hydrogen supply passage.

Also, the hydrogen concentration detection means may detect a concentration of hydrogen by detecting a concentration of impurities contained in hydrogen.

Further, the switch valve switches to the bypass passage when the concentration of hydrogen is lower than a predetermined concentration.

With this construction of the hydrogen supplying apparatus, the hydrogen supplying apparatus comprises a hydrogen concentration detection means for detecting a concentration of hydrogen to be supplied to the fuel cell, and when the hydrogen concentration detection means determines that the concentration of hydrogen is lower than a predetermined concentration, the switch valve switches to the bypass passage such that hydrogen is supplied to the fuel cell through the bypass passage. Therefore, it is possible to supply the fuel cell with high purity hydrogen as required by the fuel cell.

In accordance with still another preferable application of the present invention, the hydrogen concentration detection means determines the concentration of hydrogen depending on an electric power of the fuel cell.

With this construction of the hydrogen supplying apparatus, the hydrogen concentration detection means determines the concentration of hydrogen depending on an electric power of the fuel cell, and determines that the concentration of hydrogen is lower than a predetermined concentration when the electric power of the fuel cell lowers compared with the normal state of the fuel cell. This enables the hydrogen supplying apparatus to determine reliably whether or not impurities are mixed into hydrogen even if impurities enters the system from the hydrogen supply passage or the downstream of the purifier provided in the bypass passage. Therefore, it is possible to supply the fuel cell with high purity hydrogen as required by the fuel cell.

In accordance with another preferable application of the present invention, the hydrogen supplying apparatus further comprises an alarm means which informs a user that a supply of hydrogen is switched to the bypass passage.

In accordance with still another preferable application of the present invention, the amount of hydrogen to be supplied to the fuel cell is restricted when a supply of hydrogen is switched to the bypass passage.

BRIEF DESCRIPTION OF THE DRAWINGS

A preferred embodiment of the present invention will be described below, by way of example only, with reference to the accompanying drawings, in which.

DESCRIPTION OF THE PREFERRED EMBODIMENTS

With reference to FIGS. 1 through 7, preferred embodiments of a hydrogen supplying apparatus for a fuel cell according to the present invention will be described.

At First, a hydrogen separator as a purifier according to the invention will be described.

Various methods are known to remove/separate impurities from hydrogen. These methods include membrane separation method, PSA (pressure swing adsorption), low-temperature processing method, absorption method, etc.

Of these methods, the membrane separation method requires less mechanically operating parts, and the construction thereof is relatively simple. In the preferred embodiments, a membrane separation device 3 shown in FIG. 1 is employed as a hydrogen separator.

If pressure at a low purity hydrogen side is constant, purifying rate at the membrane separation device 3 decreases due to increased partial pressure of the constituents of impurities and decreased partial pressure of hydrogen. For this reason, it is necessary to remove or release the bleed gas (impurities-containing gas). In this instance, since hydrogen is discharged together at the time of the release, driving the membrane separation device 3 results in deteriorated fuel economy of a fuel cell system.

Figure 1:
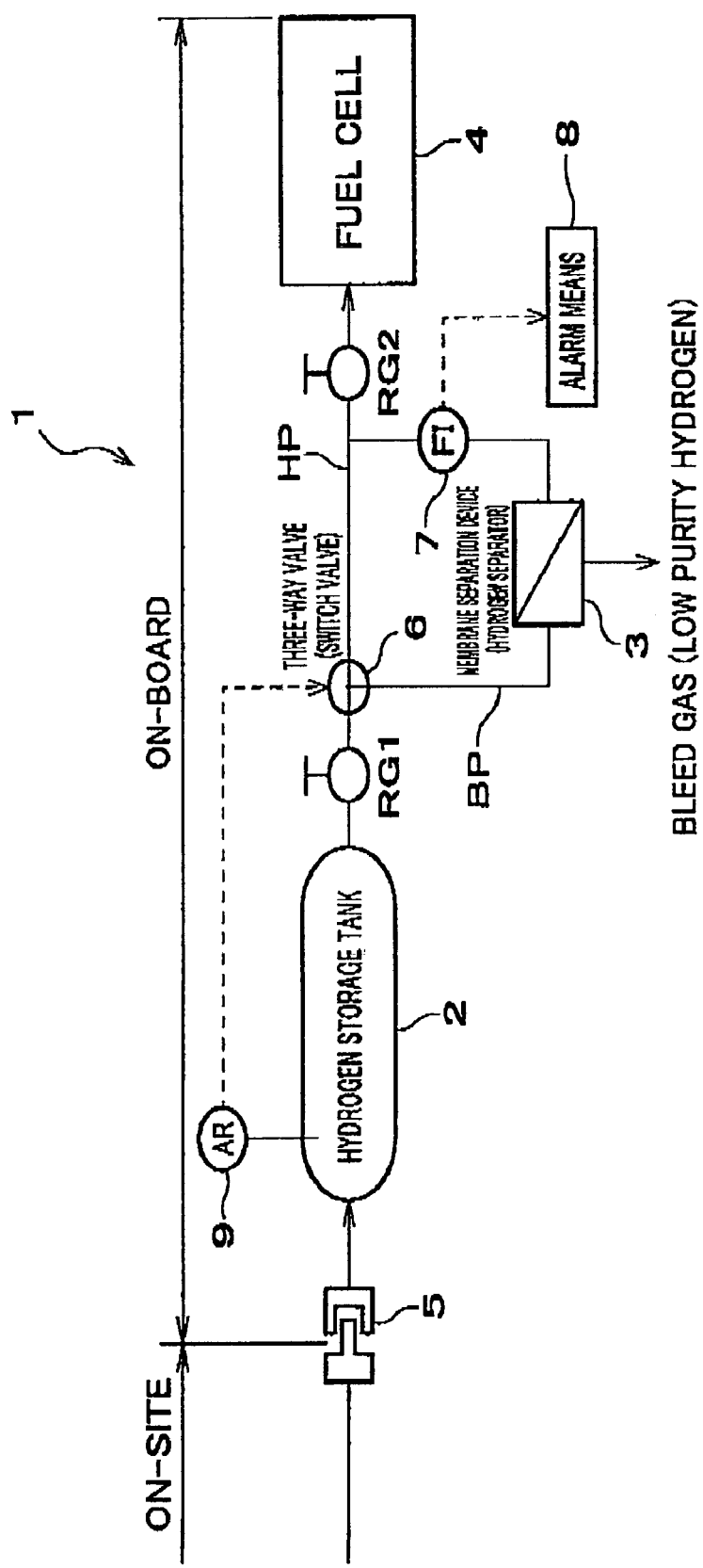
FIG. 1 shows the overall arrangement of a hydrogen supplying apparatus for a fuel cell according to a first embodiment of the present invention.

Therefore, instead of driving the membrane separation device 3 at all times, the membrane separation device 3 is driven only when the purity of hydrogen in a hydrogen storage tank 2 shown in FIG. 1 (hydrogen to be supplied to the fuel cell) deteriorates to badly affect a fuel cell 4.

A description will be given of a material to be used as a separation membrane of the membrane separation device 3. As a hydrogen-permeable membrane, that is, the separation membrane to be used for separation/purification of hydrogen at the membrane separation device 3, a polyimide membrane, a polymer membrane such as polydimethylsiloxane membrane, a metallic membrane such as Pd, pd/Ag, Pd/Ag/Cu, V, Nb, amorphous hydrogen storage alloys ($AB_2$ type and $AB_5$ type), and a composite membrane of the aforementioned molecular membrane and a porous membrane (porous polymer membrane or porous ceramic membrane), etc.

The above metallic membrane, such as platinum group membranes and the like forms a β• phase (hydride phase) with insufficient ductility in the case that high pressure hydrogen is supplied to the metallic membrane while the membrane is at a low temperature. Therefore, it is preferable to operate the membrane at high temperatures (e.g., 300° C.) in order to restrict the production of this hydride phase. For example, hydrogen released into a bleed gas (impurity gas) that is discharged from the membrane separation device 3 may be (catalytically) burned to provide a heat source, so that the driving efficiency of the membrane separation device 3 is improved.

In the preferred embodiments, a hollow fiber composite membrane, wherein polysulfone and silicone rubber are used as the base material and the coating material respectively, is employed as the hydrogen-permeable membrane of the membrane separation device 3.

A vehicle-mountable hydrogen supplying apparatus for a fuel cell according to the invention will be described below.

Figure 2:
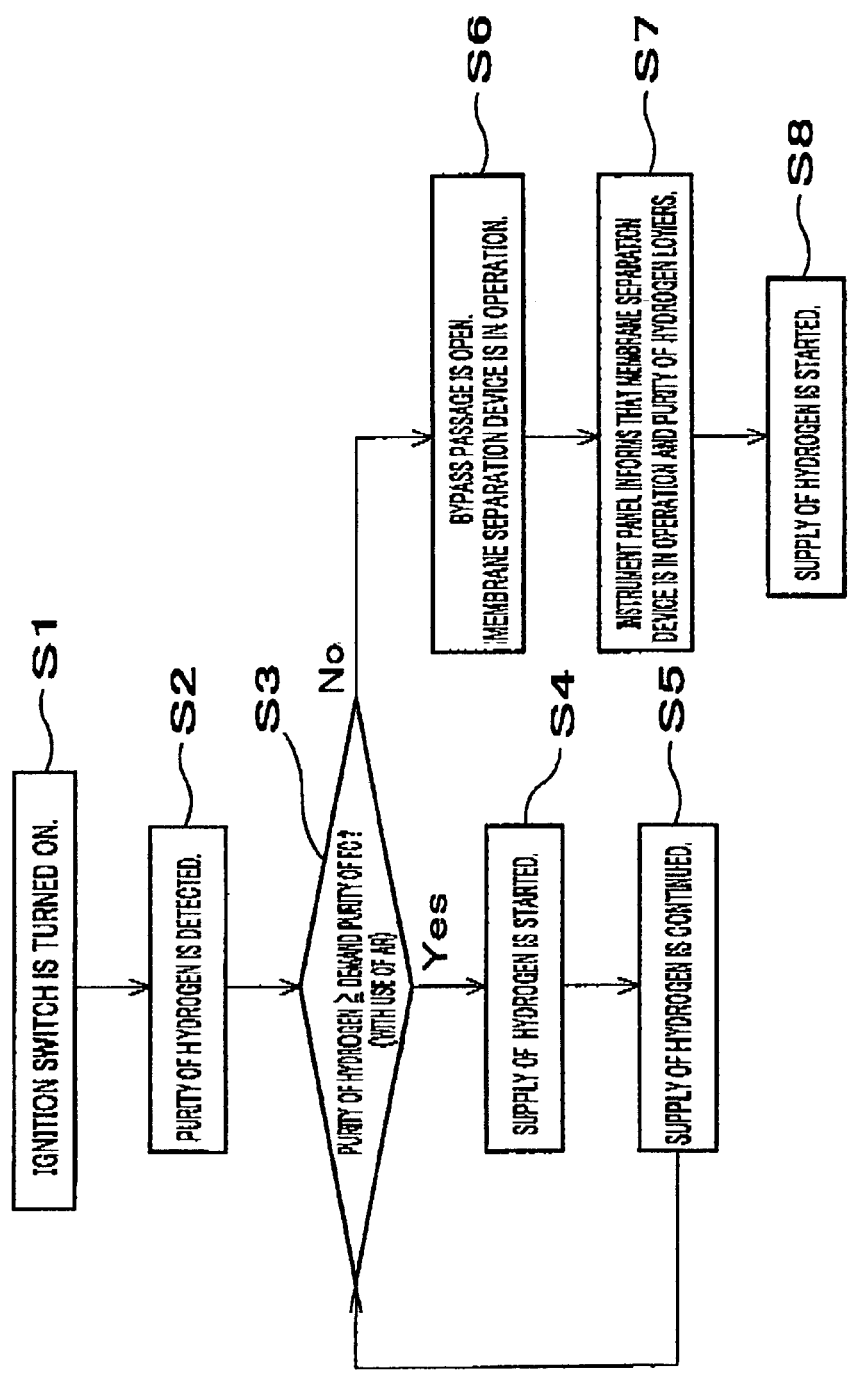
FIG. 2 is a flow chart explaining the manner of operation of the hydrogen supplying apparatus.

Firstly, the hydrogen supplying apparatus according to a first embodiment of the invention will be described with reference to FIGS. 1 and 2. Herein, FIG. 1 shows the overall arrangement of the hydrogen supplying apparatus, and FIG. 2 is a flow chart explaining the manner of operation of the hydrogen supplying apparatus.

As shown in FIG. 1, the hydrogen supplying apparatus 1 according to the first embodiment mainly comprises: a hydrogen storage tank 2 to which high pressure hydrogen is supplied and stored through a hydrogen supply port 5; a hydrogen concentration detection means detecting the concentration of hydrogen within the hydrogen storage tank 2 (hydrogen to be supplied to the fuel cell 4); a hydrogen supply passage HP for supplying hydrogen from the hydrogen storage tank 2 to the fuel cell 4; two regulators RG1, RG2 provided in the hydrogen supply passage HP and regulating the pressure of hydrogen to be supplied to the fuel cell 4; a bypass passage BP arranged in parallel with the hydrogen supply passage HP and for supplying hydrogen to the fuel cell 4; a membrane separation device 3 as a hydrogen separator provided in the bypass passage BP and having a hydrogen-permeable membrane so that hydrogen that could pass through the hydrogen-permeable membrane is supplied to the fuel cell 4 and hydrogen that could not pass through the hydrogen-permeable membrane is discharged; a flow rate detection means 7 provided downstream of the membrane separation device 3 and detecting the flow rate of hydrogen within the bypass passage BP; and a three-way valve 6 as a switch valve selectively switching the hydrogen supply passage HP and the bypass passage BP.

Manner of operation of the hydrogen supplying apparatus 1 as constructed above will be described with reference to FIGS. 1 and 2.

At a high pressure hydrogen supplying-type station, high pressure hydrogen (e.g., filling pressure of 35 MPaG) is previously supplied to and stored in the hydrogen storage tank 2 mounted on the vehicle through the hydrogen supply port 5.

(1) Ignition switch of the vehicle is turned on (step S1).

(2) Purity (concentration) of hydrogen is detected with the hydrogen concentration detection means (step S2). As the hydrogen concentration detection means, for example, a hydrogen gas sensor utilizing proton conductors, a mass spectrometer, a process gas chromatography, and the like may be used. In this embodiment, a process gas chromatography 9 is employed.

(3) With the process gas chromatography 9, a detection is carried out to determine whether the purity (concentration) of hydrogen within the hydrogen storage tank 2 is equal to or more than the demand purity (demand hydrogen concentration) required by the fuel cell 4 (step S3).

To detect hydrogen concentration, either the concentration of hydrogen or the concentration of impurities (e.g., carbon monoxide CO concentration) is detected.

(4) Supply of hydrogen to the fuel cell 4 is started in the case that hydrogen is equal to or more than the demand purity (demand hydrogen concentration) as the result of the detection of hydrogen concentration (step S4).

(5) Supply of hydrogen is continued in the case that the purity (concentration) of hydrogen is equal to or more than the demand purity (demand hydrogen concentration) required by the fuel cell 4 (step S5).

(6) If the purity (concentration) of hydrogen is less than the demand purity (demand hydrogen concentration) required by the fuel cell 4, the three-way valve 6 switches the supply of hydrogen from the hydrogen supply passage HP to the bypass passage BP and the membrane separation device 3 as the hydrogen separator is operated (step S6).

(7) When doing so, by the use of an output signal of a thermal mass flowmeter 7 as the hydrogen flow rate detection means (or a change-over signal of the three-way valve 6), an alarm means such as an instrument panel 8 of the driving console informs the driver that the membrane separation device 3 is in operation and the purity (concentration) of hydrogen lowers (step S7).

(8) Hydrogen is supplied from the hydrogen storage tank 2 to the fuel cell 4 via the membrane separation device 3 provided in the bypass passage BP (step S8).

According to the hydrogen supplying apparatus for the fuel cell thus constructed and operated, the following advantages are achieved.

(1) Hydrogen supply passage HP and the bypass passage BP provided with the membrane separation device 3 can be switched selectively when needed. As a result, the membrane separation device 3 as the hydrogen separator does not have to drive at all times, leading to improvement in the utilization efficiency of hydrogen to be supplied from the hydrogen storage tank 2 to the fuel cell 4.

(2) Hydrogen supplying apparatus includes, as the hydrogen concentration detection means for detecting the concentration of hydrogen to be supplied to the fuel cell 4, the process gas chromatography 9 in the hydrogen storage tank 2, and when the concentration of hydrogen is determined as being lower than a predetermined concentration, the three-way valve switches to the bypass passage BP such that hydrogen is supplied to the fuel cell 4 via the membrane separation device 3. Therefore, it is possible to supply the fuel cell 4 with high purity hydrogen as required by the fuel cell 4.

(3) Since the hydrogen supplying apparatus includes the instrument panel 8 of the driving console, as the alarm means that detects the supply of hydrogen through the bypass passage BP to the fuel cell 4 and informs the detection result, it is possible to alarm users of the fuel cell system, such as the driver and a person in charge of storage facilities in the hydrogen station.

Next, the hydrogen supplying apparatus according to a second embodiment of the invention will be described with reference to FIGS. 3 through 5. Herein, FIG. 3 shows the overall arrangement of the hydrogen supplying apparatus according to the second embodiment of the present invention, FIG. 4 is a graph explaining how to detect a decrease in purity (concentration) of hydrogen based on a change of I-V characteristic of the fuel cell, and FIG. 5 is a flow chart explaining the manner of operation of the hydrogen supplying apparatus according to the second embodiment.

Figure 3:
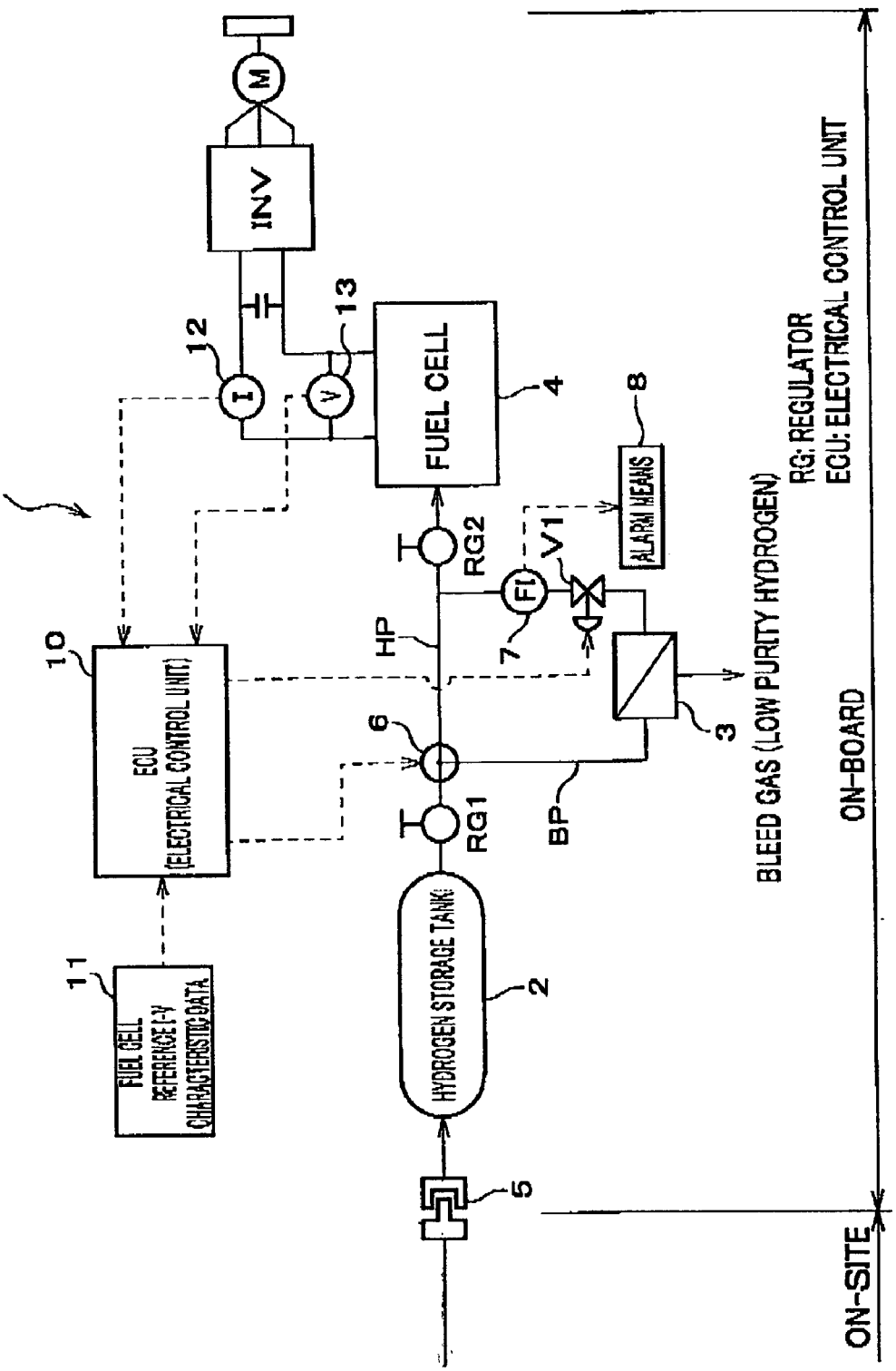
FIG. 3 shows the overall arrangement of a hydrogen supplying apparatus for a fuel cell according to a second embodiment of the present invention.

As shown in FIG. 3, the hydrogen supplying apparatus according to the second embodiment is substantially the same in construction with the hydrogen supplying apparatus according to the first embodiment except that a hydrogen concentration detection means, which is different from the hydrogen concentration detection means according to the first embodiment, is provided at the fuel cell side and that a flow control valve V1 is provided at the outlet of the membrane separation device 3 (at the outlet of the bypass passage BP).

Parts similar to those previously described in relation to the hydrogen supplying apparatus according to the first embodiment are denoted by the same reference numerals and are not specifically described here.

Figure 4:
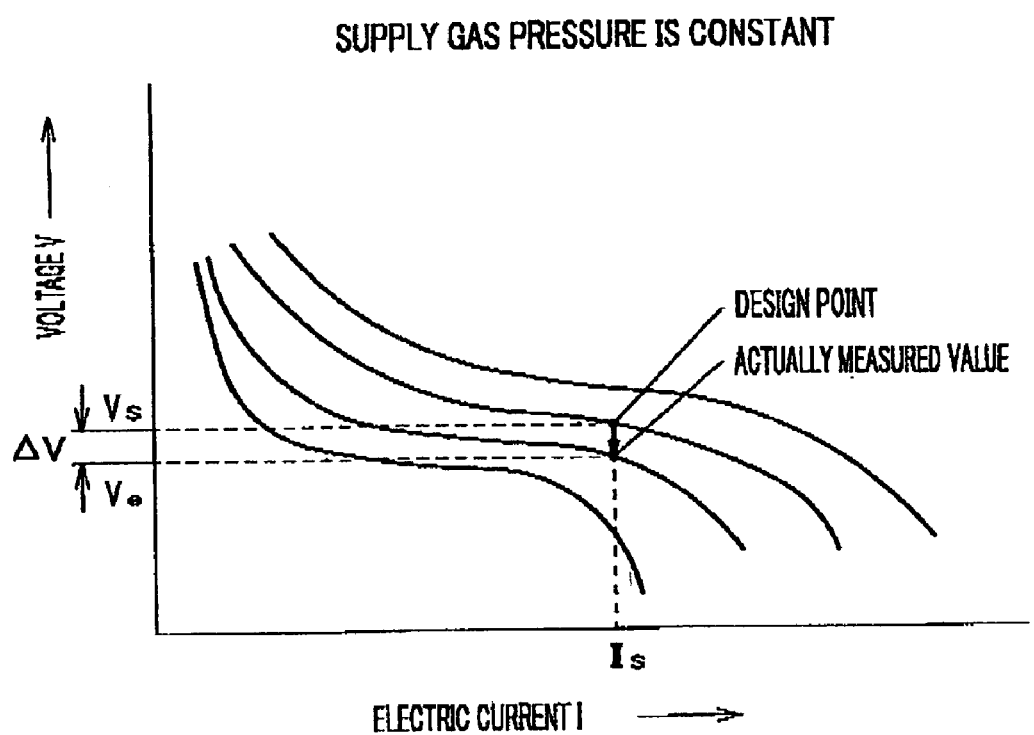
FIG. 4 is a graph explaining how to detect a-decrease in purity (concentration) of hydrogen based on a change of I-V characteristic of the fuel cell.
Figure 5:
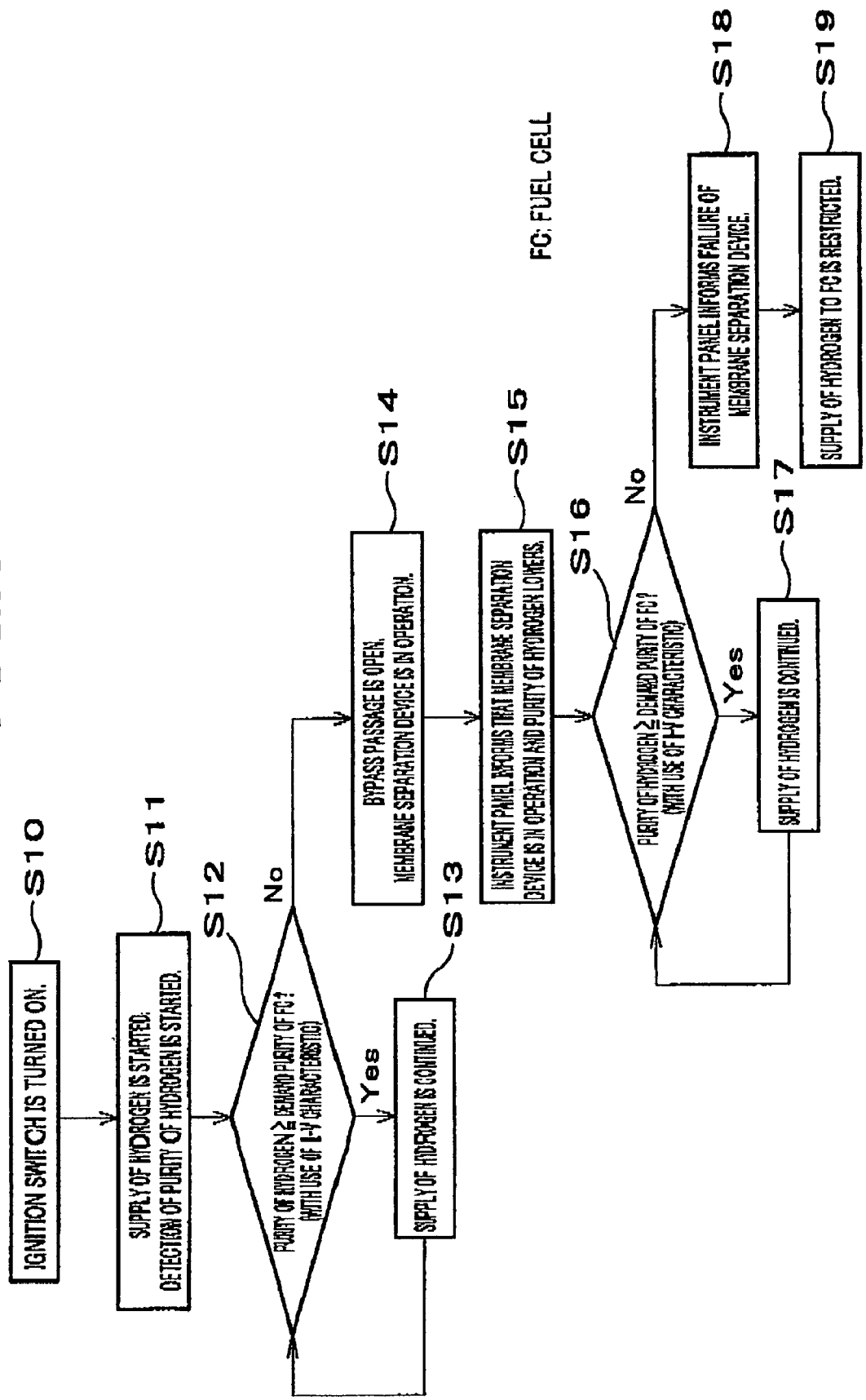
FIG. 5 is a flow chart explaining the manner of operation of the hydrogen supplying apparatus according to the second embodiment.

Referring now to FIG. 4, a description will be given of the hydrogen concentration detection means provided in the hydrogen supplying apparatus according to the second embodiment to determine whether impurities are mixed into hydrogen on the basis of a change of I (current)-V (voltage) characteristic of the fuel cell.

Examples of the data showing I-V characteristic of the fuel cell 4 are shown in FIG. 4. In FIG. 4, the axis of ordinate indicates voltage (V) and the axis of abscissas indicates electric current (I). FIG. 4 plots characteristic curves in a condition where the pressure of the supplied gas is constant.

The I-V characteristic data 11 as a reference of the fuel cell 4 is previously inputted to the electrical control unit 10 (FIG. 3) and is stored in ROM or RAM as the reference data. An ammeter 12 and a voltmeter 13 are provided at the power take-off side of the fuel cell 4, and measured data from the ammeter 12 and the voltmeter 13 are also inputted to the electrical control unit 10 as electric signals.

The electrical control unit 10 to be used herein is an electrical control device consists of an electric control circuit or a microcomputer mainly constructed from RAM, ROM, CPU (or MPU), I/O and the like. At the input portion of this control device, electric signals from other devices concerning the output of the fuel cell 4, such as non-illustrated accelerator opening-degree sensor, non-illustrated battery capacity sensor, etc., are also inputted, and the hydrogen supplying apparatus 20 is controlled by output signals based on these input signals.

Electric power generated by the fuel cell 4 is converted at an inverter from direct current to alternate current, and is utilized to drive the electric motor and the like.

As shown in FIG. 4, if impurities-containing hydrogen is supplied to the hydrogen supplying apparatus 20 including the hydrogen concentration detection means as previously described, the voltage value Vs corresponding to a certain current value Is decreases in the vertical direction from the design point of the fuel cell 4 to Ve (under the condition that the pressure of the supply gas to be supplied to the fuel cell 4 is constant).

Accordingly, impurities mixed into hydrogen can be detected easily by detecting the current value and the voltage value to monitor the electric power at a load side where generated electric power is taken off from the fuel cell 4 because the electric power lowers relative to a certain current value.

Manner of operation of the hydrogen supplying apparatus 1 according to the second embodiment will be described with reference to FIGS. 3 and 5. At a high pressure hydrogen supplying-type station, high pressure hydrogen (e.g., filling pressure of 35 MPaG) is previously supplied to and stored in the hydrogen storage tank 2 mounted on the vehicle through the hydrogen supply port 5.

(1) Ignition switch of the vehicle is turned on (step S10).

(2) Supply of hydrogen to the fuel cell 4 is started, and purity (concentration) of hydrogen is detected with the hydrogen concentration detection means (step S11).

(3) With the hydrogen concentration detection means (to detect whether or not the electric power lowers in comparison with the reference I-V characteristic of the fuel cell), a detection is carried out to determine whether the purity (concentration) of hydrogen to be supplied to the fuel cell 4 is equal to or more than the demand purity (demand hydrogen concentration) required by the fuel cell 4 (step S12).

(4) Supply of hydrogen to the fuel cell 4 is continued in the case that the purity (concentration) of hydrogen is equal to or more than the demand purity (demand hydrogen concentration) (step S13).

(5) If the purity (concentration) of hydrogen is less than the demand purity required by the fuel cell 4, the three-way valve 6 as the switch valve switches the supply of hydrogen from the hydrogen supply passage HP to the bypass passage BP and the membrane separation device 3 as the hydrogen separator is operated (step S14).

(6) When doing so, by the use of an output signal of a thermal mass flowmeter 7 as the hydrogen flow rate detection means (or a change-over signal of the three-way valve 6), an alarm means such as an instrument panel 8 of the driving console informs the driver that the membrane separation device 3 is in operation and the purity (concentration) of hydrogen lowers (step S15).

(7) Based on the comparison between the electric power obtained from the reference I-V characteristic and the electric power obtained from the actually measured current value and voltage value, a detection is carried out to determine whether the purity (concentration) of hydrogen to be supplied to the fuel cell 4 is equal to or more than the demand purity required by the fuel cell 4 (step S16).

(8) In the case that the purity (concentration) of hydrogen to be supplied to the fuel cell 4 is equal to or more than the demand purity required by the fuel cell 4, hydrogen is continuously supplied to the fuel cell 4 via the membrane separation device 3 provided in the bypass passage BP (step S17).

(9) Notwithstanding that the membrane separation device 3 is in operation, if the purity (concentration) of hydrogen is determined as being lower than the demand purity in consideration of the amount of hydrogen supplied to the fuel cell 4 and the electricity generation characteristic of the fuel cell 4, the alarm means such as the instrument panel 8 of the driving console informs a failure of the membrane separation device (step S18). The amount of hydrogen supplied to the fuel cell 4 is restricted by means of a control valve V1 (step S19).

According to the hydrogen supplying apparatus for the fuel cell thus constructed and operated, the following advantages are achieved.

(1) Since the hydrogen concentration detection means detects the electric power with respect to the generated electric current of the fuel cell 4, determines the concentration of hydrogen depending on the electric power of the fuel cell, and determines that the concentration of hydrogen is lower than a predetermined concentration when the electric power lowers compared with the normal state of the fuel cell 4. This enables the hydrogen supplying apparatus to determine reliably whether or not impurities are mixed into hydrogen even if impurities enters the fuel cell system from the hydrogen supply passage HP or the downstream of the membrane separation device 3 provided in the bypass passage BP. Therefore, it is possible to supply the fuel cell 4 with high purity hydrogen as required by the fuel cell 4.

(2) Since the hydrogen supplying apparatus includes the instrument panel 8 of the driving console, as the alarm means that detects the supply of hydrogen through the bypass passage BP to the fuel cell 4 and informs the detection result, it is possible to alarm users of the fuel cell system, such as the driver and a person in charge of storage facilities in the hydrogen station.

Figure 6:
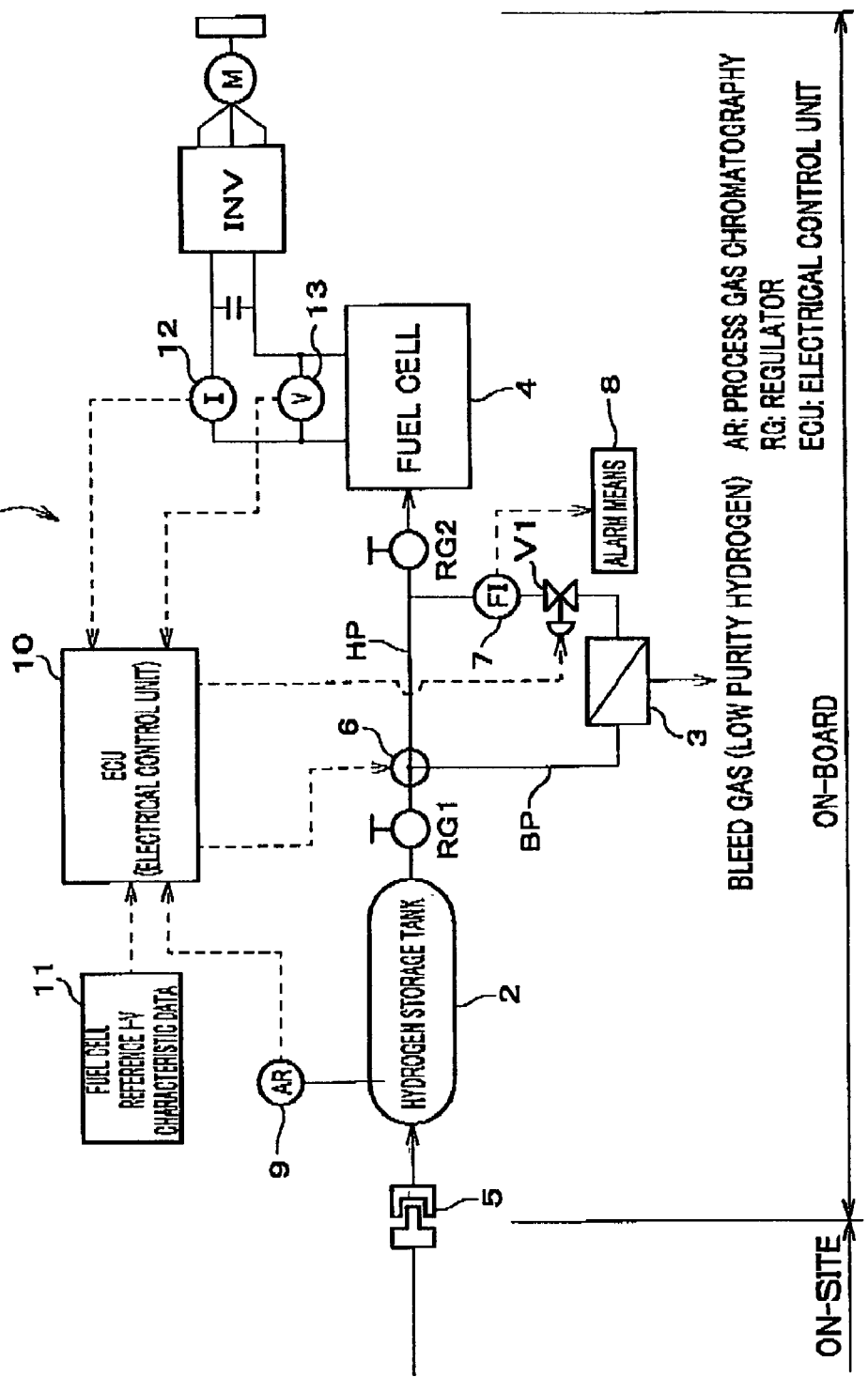
FIG. 6 shows the overall arrangement of a hydrogen supplying apparatus for a fuel cell according to a third embodiment of the present invention.
Figure 7:
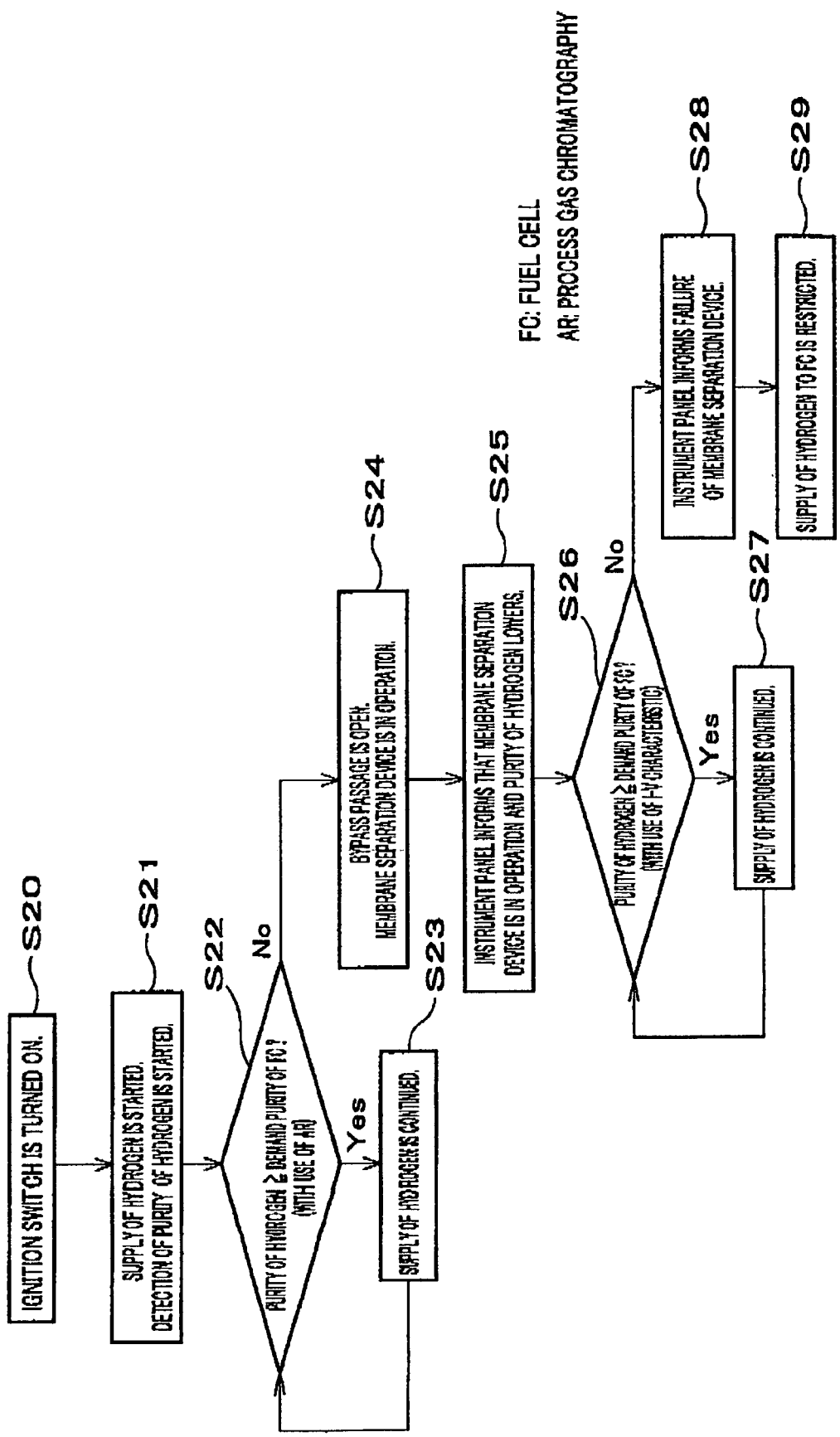
FIG. 7 is a flow chart explaining the manner of operation of the hydrogen supplying apparatus according to the third embodiment.
Figure 8:
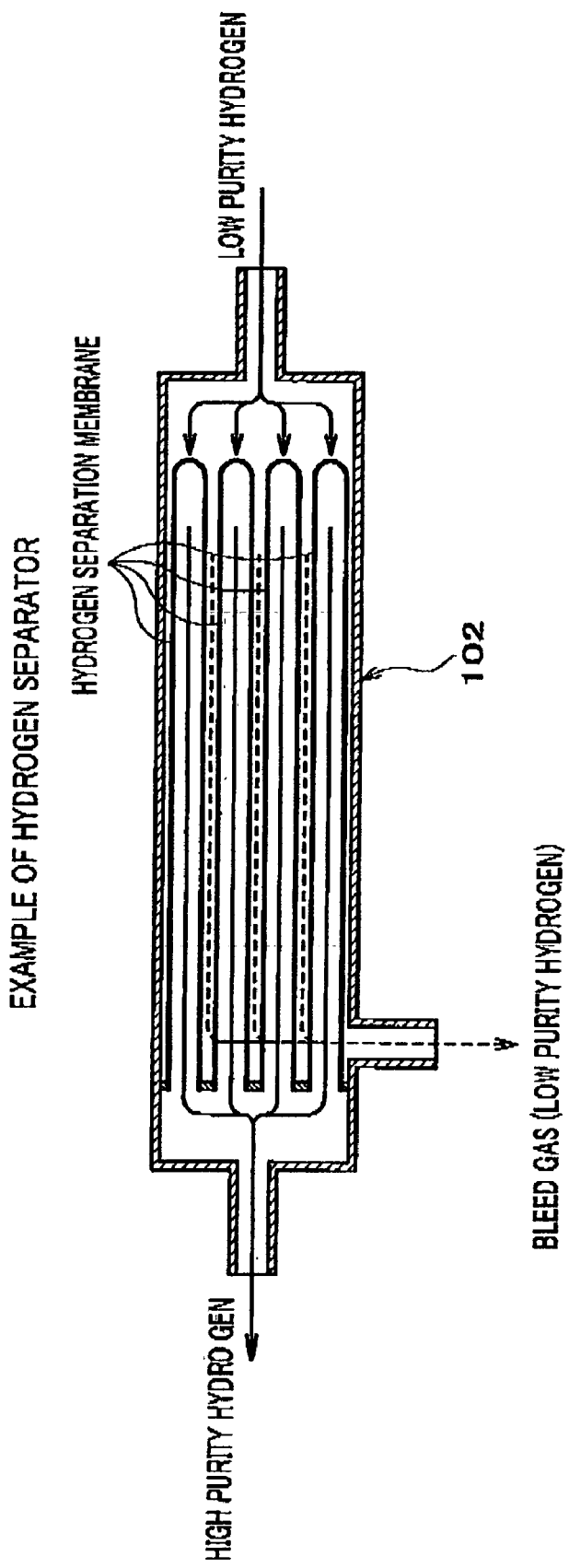
FIG. 8 shows one example of a conventional hydrogen separator.

Finally, the hydrogen supplying apparatus according to a third embodiment of the invention will be described with reference to FIGS. 6 and 7. Herein, FIG. 6 shows the overall arrangement of the hydrogen supplying apparatus according to the third embodiment of the present invention, and FIG. 7 is a flow chart explaining the manner of operation of the hydrogen supplying apparatus according to the third embodiment.

The hydrogen supplying apparatus 30 according to the third embodiment is constructed as a combination of the hydrogen supplying apparatus according to the first embodiment and the hydrogen supplying apparatus according to the second embodiment. To be more specific, the hydrogen supplying apparatus 30 is constructed such that two different hydrogen concentration detection means are provided in the hydrogen storage tank 2 and at the power take-off side of the fuel cell 4.

Manner of operation of the hydrogen supplying apparatus 30 according to the third embodiment will be described with reference to FIG. 7. At a high pressure hydrogen supplying-type station, high pressure hydrogen (e.g., filling pressure of 35 MPaG) is previously supplied to and stored in the hydrogen storage tank 2 mounted on the vehicle through the hydrogen supply port 5.

(1) Ignition switch of the vehicle is turned on (step S20).

(2) Supply of hydrogen to the fuel cell 4 is started, and purity (concentration) of hydrogen is detected with the process gas chromatography 9 as the hydrogen concentration detection means (step S21).

As the hydrogen concentration detection means, for example, a hydrogen gas sensor utilizing proton conductors, a mass spectrometer, and the like may be used. In this embodiment, a process gas chromatography 9 is employed.

(3) With the process gas chromatography 9, a detection is carried out to determine whether the purity (concentration) of hydrogen within the hydrogen storage tank 2 is equal to or more than the demand purity (demand hydrogen concentration) required by the fuel cell 4 (step S22).

(4) Supply of hydrogen to the fuel cell 4 is continued in the case that the purity (concentration) of hydrogen is equal to of more than the demand purity (step S23).

(5) If the purity (concentration) of hydrogen is less than the demand purity required by the fuel cell 4, the three-way valve 6 as the switch valve switches the supply of hydrogen from the hydrogen supply passage HP to the bypass passage BP and the membrane separation device 3 as the hydrogen separator is operated (step S24).

(6) When doing so, an alarm means such as an instrument panel 8 of the driving console informs the driver that the membrane separation device 3 is in operation and the purity (concentration) of hydrogen lowers (step S25).

(7) With the hydrogen concentration detection means (to detect whether or not the electric power lowers in comparison with the reference I-V characteristic of the fuel cell), a detection is carried out to determine whether the purity (concentration) of hydrogen to be supplied to the fuel cell 4 is equal to or more than the demand purity (demand hydrogen concentration) required by the fuel cell (step S26).

(8) In the case that the purity (concentration) of hydrogen to be supplied to the fuel cell 4 is equal to or more than the demand purity (demand hydrogen concentration), hydrogen is continuously supplied to the fuel cell 4 (step S27).

(9) Notwithstanding that the membrane separation device 3 is in operation, if the purity (concentration) of hydrogen is determined as being lower than the demand purity in consideration of the amount of hydrogen supplied to the fuel cell 4 and the electricity generation characteristic of the fuel cell 4, the alarm means such as the instrument panel 8 of the driving console informs a failure of the membrane separation device 3 as the hydrogen separator (step S28). The amount of hydrogen supplied to the fuel cell 4 is restricted by means of a control valve V1 (step S29).

According to the hydrogen supplying apparatus for the fuel cell thus constructed and operated, the following advantages are achieved.

(1) When the purity (concentration) of hydrogen within the hydrogen storage tank 2 is lower, hydrogen is supplied to the fuel cell 4 via the bypass passage BP provided with the membrane separation device 3 as the hydrogen separator. This can be informed by means of the alarm means.

(2) Even if hydrogen is supplied to the fuel cell 4 via the bypass passage BP provided with the membrane separation device 3, when the purity (concentration) of hydrogen is lower as the result of reverse calculation of the purity of hydrogen on the basis of electric power generated at the fuel cell 4 and the like, this can be informed to the driver by means of the alarm means, and thereafter the amount of hydrogen supplied to the fuel cell 4 is restricted.

(3) Since maintenance of the membrane separation device 3 as the hydrogen separator is promoted, the electric vehicle can be driven properly.

(4) Since the hydrogen supplying apparatus includes the instrument panel 8 of the driving console, as the alarm means that detects the supply of hydrogen through the bypass passage BP to the fuel cell 4 and informs the detection result, it is possible to alarm users of the fuel cell system, such as the driver and a person in charge of storage facilities in the hydrogen station.

While the present invention has been described in detail with reference to first to third preferred embodiments thereof, it will be apparent to one skilled in the art that various changes and modifications may be made without departing from the scope of the claims.

For example, in place of the three-way valve 6 as the switch valve, a solenoid valve may be provided in the hydrogen supply passage HP and the bypass passage BP respectively, so as to switch the supply of hydrogen.

What is claimed is:

1. A hydrogen supplying apparatus mounted on an electric vehicle, the electric vehicle being driven by electricity generated at a fuel cell by an electrochemical reaction between hydrogen stored in a hydrogen storage tank and oxygen, comprising:

a hydrogen supply passage for supplying hydrogen from the hydrogen storage tank to the fuel cell;

a bypass passage arranged in parallel with the hydrogen supply passage and for supplying hydrogen to the fuel cell;

a purifier provided in the bypass passage, the purifier purifying hydrogen to be supplied to the fuel cell;

a switch valve configured for directing hydrogen from the hydrogen storage tank to the hydrogen supply passage or the bypass passage to supply to supply hydrogen to the fuel cell; and a hydrogen concentration detection means for detecting a concentration of hydrogen to be supplied to the fuel cell, and wherein said switch valve is controlled to switch the hydrogen supply passage and the bypass passage based on a detection result of the hydrogen concentration detection means.

2. A hydrogen supplying apparatus according to claim 1, wherein said purifier comprises a hydrogen separation membrane and supplies the fuel cell with hydrogen that has passed through the hydrogen separation membrane.

3. A hydrogen supplying apparatus according to claim 1, wherein said hydrogen concentration detection means detects a concentration of hydrogen within the hydrogen storage tank.

4. A hydrogen supplying apparatus according to claim 1, wherein said hydrogen concentration detection means detects a concentration of hydrogen within the hydrogen supply passage.

5. A hydrogen supplying apparatus according to claim 1, wherein said hydrogen concentration detection means detects a concentration of hydrogen by detecting a concentration of impurities contained in hydrogen.

6. A hydrogen supplying apparatus according to claim 1, wherein said switch valve switches to the bypass passage when the concentration of hydrogen is lower than a predetermined concentration.

7. A hydrogen supplying apparatus according to claim 1, wherein said hydrogen concentration detection means determines the concentration of hydrogen depending on an electric power of the fuel cell.

8. A hydrogen supplying apparatus according to claim 1, further comprising an alarm means which informs a user that a supply of hydrogen is switched to the bypass passage.

9. A hydrogen supplying apparatus according to claim 1, wherein the amount of hydrogen to be supplied to the fuel cell is restricted when a supply of hydrogen is switched to the bypass passage.

* * * * *